United States Patent
Shih et al.

(10) Patent No.: US 8,285,135 B2
(45) Date of Patent: Oct. 9, 2012

(54) METHOD AND DEVICE FOR ADJUSTING WEIGHTING VALUES IN LIGHT METERING

(75) Inventors: Shuo-Li Shih, Taipei County (TW); Hsin-Yu Chen, Tainan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 12/814,475

(22) Filed: Jun. 13, 2010

(65) Prior Publication Data

US 2011/0052175 A1 Mar. 3, 2011

(30) Foreign Application Priority Data

Sep. 1, 2009 (TW) .............................. 98129459 A

(51) Int. Cl.
*G03B 7/08* (2006.01)

(52) U.S. Cl. ..................... 396/234; 382/165; 348/221.1

(58) Field of Classification Search .................. 396/234; 382/165; 348/221.1
See application file for complete search history.

(56) References Cited

U.S. PATENT DOCUMENTS

| | | | |
|---|---|---|---|
| 6,249,317 B1 * | 6/2001 | Hashimoto et al. | 348/364 |
| 6,940,545 B1 | 9/2005 | Ray et al. | |
| 7,426,296 B2 | 9/2008 | Lee et al. | |
| 2005/0169520 A1 * | 8/2005 | Chen et al. | 382/165 |
| 2007/0216777 A1 * | 9/2007 | Quan et al. | 348/222.1 |
| 2008/0226279 A1 * | 9/2008 | Dey et al. | 396/234 |
| 2010/0209093 A1 * | 8/2010 | Uehara | 396/124 |

FOREIGN PATENT DOCUMENTS

| | | |
|---|---|---|
| CN | 1997113 A | 7/2007 |
| JP | 2004040462 A | 2/2004 |

OTHER PUBLICATIONS

Translation of JP Publication No. 2004-040462; Title: Image Pickup Equipment; Inventor: Kishida et al.; Publication Date: Feb. 5, 2004.*

* cited by examiner

*Primary Examiner* — W.B. Perkey
*Assistant Examiner* — Fang-Chi Chang
(74) *Attorney, Agent, or Firm* — Rabin & Berdo, P.C.

(57) ABSTRACT

A method for adjusting weighting values in light metering is provided. An input image is divided into multiple metering zones. The input image includes a number of pixel data, and the metering zones correspond to a number of exposure weighting values. It is determined whether the color of each pixel datum of the input image is skin color. For each metering zone, an amount of the pixel data determined as the skin color is calculated. The corresponding exposure weighting values of the metering zones are adjusted according to the calculated results.

14 Claims, 4 Drawing Sheets

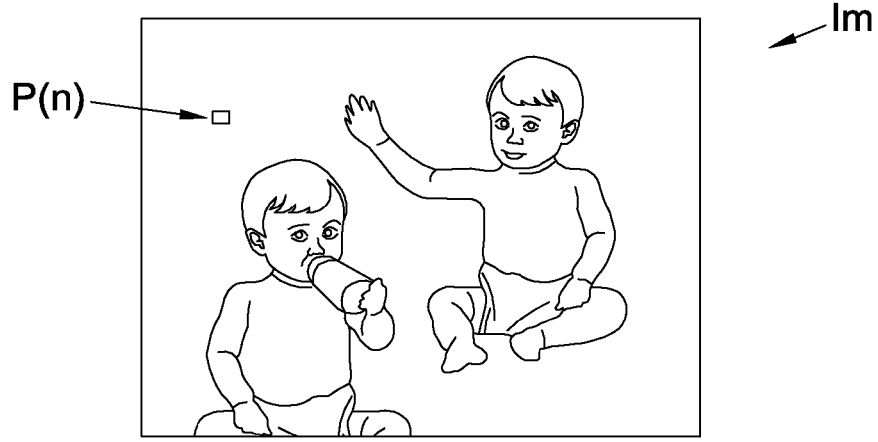
FIG. 3A
|  |  |  |  |  |
|---|---|---|---|---|
| (1) | (2) | (3) | (4) | (5) |
| (6) | (7) | (8) | (9) | (10) |
| (11) | (12) | (13) | (14) | (15) |
| (16) | (17) | (18) | (19) | (20) |
| (21) | (22) | (23) | (24) | (25) |
FIG. 3B
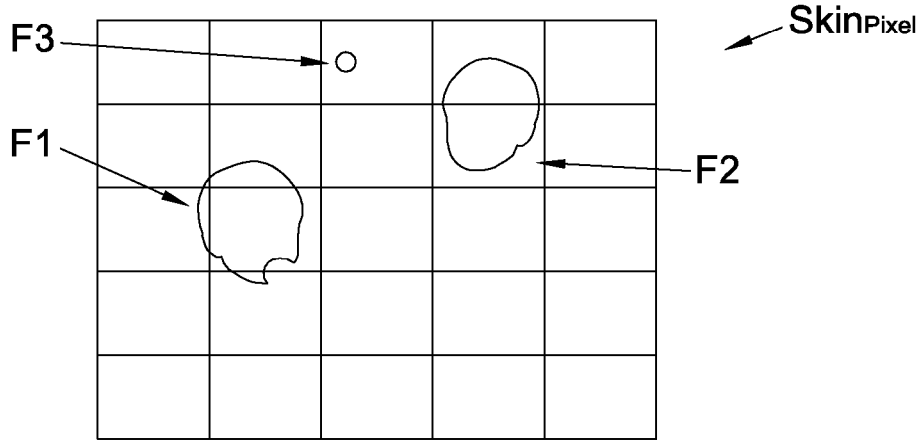
FIG. 3C

METHOD AND DEVICE FOR ADJUSTING WEIGHTING VALUES IN LIGHT METERING

This application claims the benefit of Taiwan application Serial No. 98129459, filed Sep. 1, 2009, the subject matter of which is incorporated herein by reference.

BACKGROUND OF THE APPLICATION

1. Field of the Application

The application relates in general to a method and a device for adjusting weighting values in light metering, and more particularly to a method and a device for adjusting weighting values in multi-zone metering.

2. Description of the Related Art

In photography, exposure refers to the total amount of light incident on a photographic medium, such as a photographic film or an image sensor, during taking a photograph. Exposure is measured in lux seconds, and can be computed with respect to exposure value (EV) and scene luminance over a specified area.

At present, various metering modes are provided in camera to allow the user to select the most appropriate one for determining optimal exposure value. In general, the light metering modes include spot metering mode, center-weighted average metering mode, average metering mode, partial metering mode, and multi-zone metering modes.

In conventional, when a human being is photographed, optimal exposure time is determined by analyzing the environment luminance at human face, so that human face is presented by an appropriate luminance in the photograph. In this way, however, a great deal of arithmetical computation and complex image analysis are required for detecting location of the human face, thereby increasing the cost and computational complexity. This way, moreover, requires the whole image to be temporarily stored in the memory, resulting in an increased cost and a lower speed.

SUMMARY OF THE APPLICATION

Example of the application is directed to a method and a device for adjusting weighting values in light metering, in which an input image is divided into multiple metering zones, and the amount of pixel data determined as skin color is calculated for each metering zone, so as to adjust the corresponding exposure weighting values of the metering zones. In this way, the exposure time can be determined according to the exposure weighting values obtained by simple computation, such as counting number, thereby reducing the cost and computational complexity. Moreover, an embodiment of the application can process pixel data sequentially, which increases the computational speed significantly. Furthermore, an embodiment of the application can avoid using high-capacity memory to store the whole input image, thereby saving space for hardware implementation.

According to an example of the present application, a method for adjusting weighting values in light metering is provided. An input image is divided into multiple metering zones. The input image includes a number of pixel data and the metering zones correspond to a number of exposure weighting values. It is determined whether the color of each pixel datum of the input image is skin color. For each metering zone, an amount of the pixel data determined as the skin color is calculated. The corresponding exposure weighting values of the metering zones are adjusted according to the calculated results.

According to another example of the present application, a device for adjusting weighting values in light metering is provided. The device divides an input image into multiple metering zones and adjusts corresponding weighting values of the metering zones. The input image includes a number of pixel data. The device includes a determination unit, a calculation unit, and a weighting adjustment unit. The determination unit is for determining whether the color of each pixel datum of the input image is skin color. The calculation unit is for calculating an amount of the pixel data determined as the skin color for each metering zone. The weighting adjustment unit is for adjusting the corresponding exposure weighting values of the metering zones according to the calculated results.

The application will become apparent from the following detailed description of the preferred but non-limiting embodiments. The following description is made with reference to the accompanying drawings.

BRIEF DESCRIPTION OF THE DRAWINGS

FIG. 3A is a schematic diagram showing an input image which includes human face patterns and is obtained by an image sensor unit;

FIG. 3B is a schematic diagram showing multiple metering zones in the input image in FIG. 3A;

FIG. 3C is a schematic diagram showing an example of distribution of skin color pixels of the multiple metering zones in FIG. 3B;

DETAILED DESCRIPTION OF THE APPLICATION

Figure 1:
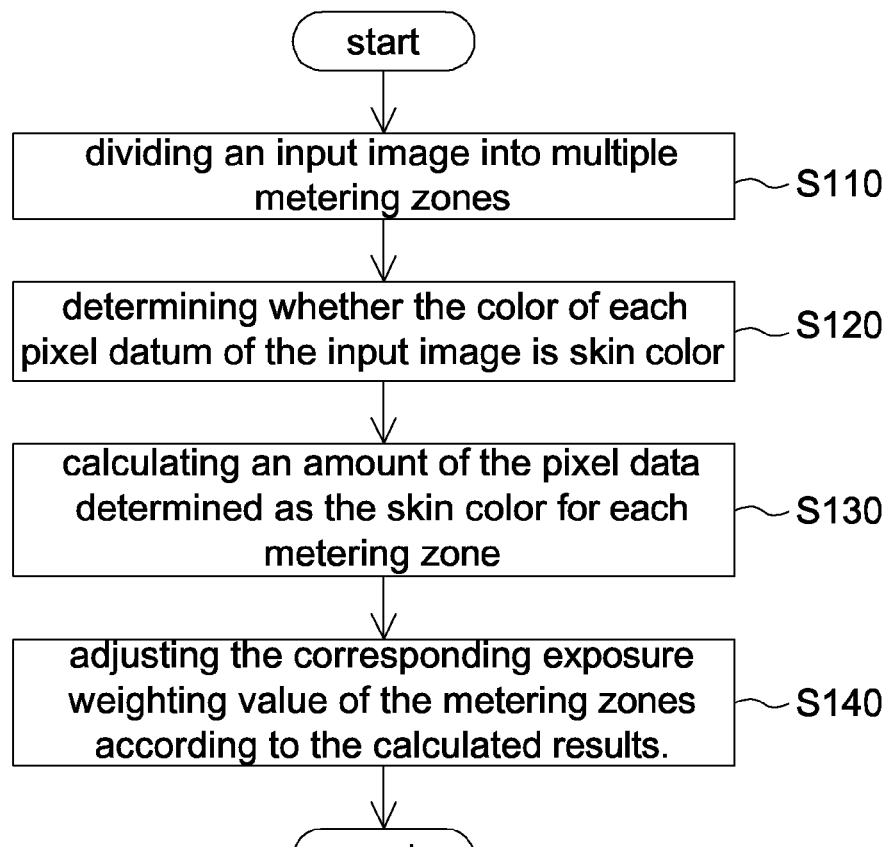
FIG. 1 is a flowing chart showing a method for adjusting weighting values in light metering according to an embodiment of the application.

FIG. 1 is a flowing chart showing a method for adjusting weighting values in light metering according to an embodiment of the application. The method includes the following steps. As shown in step S110, an input image is divided into multiple metering zones. The input image includes a number of pixel data and the metering zones correspond to a number of exposure weighting values. As shown in step S120, it is determined whether the color of each pixel datum of the input image is skin color. As shown in step S130, for each metering zone, an amount of the pixel data determined as the skin color is calculated. As shown in step S140, the corresponding exposure weighting values of the metering zones are adjusted according to the calculated results.

Figure 2:
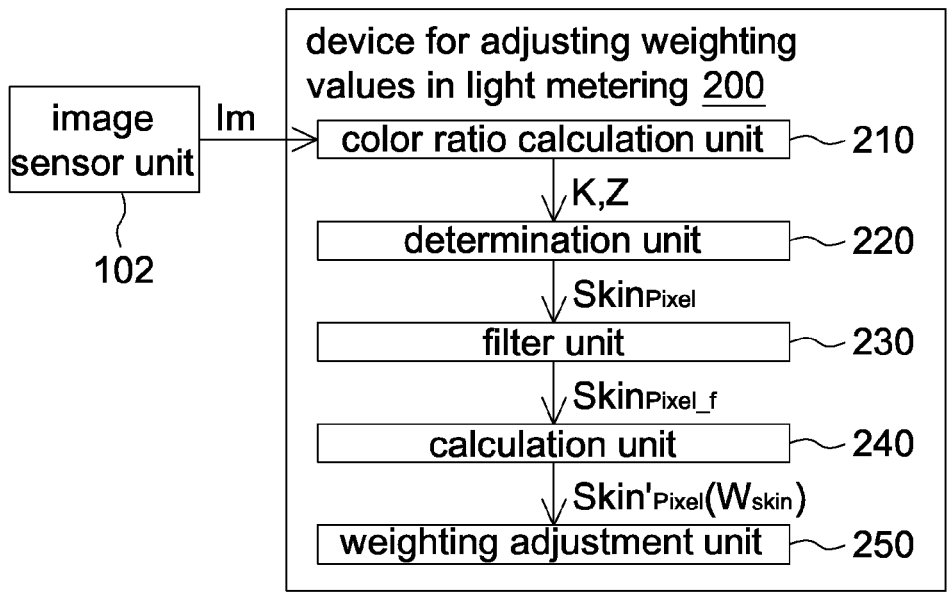
FIG. 2 is a block diagram showing a device for adjusting weighting values in light metering according to the embodiment of the application.

A device for adjusting weighting values in light metering, executing the method for adjusting weighting values in FIG. 1, is made as an example for further elaboration. Refer to FIGS. 2, 3A, and 3B. FIG. 2 is a block diagram showing a device for adjusting weighting values in light metering according to the embodiment of the application. FIG. 3A is a schematic diagram showing an input image Im which includes human face patterns and is obtained by an image sensor unit. FIG. 3B is a schematic diagram showing multiple metering zones MA in the input image Im in FIG. 3A.

The device 200 for adjusting weighting values in light metering includes a color ratio determination unit 210, a determination unit 220, a filter unit 230, a calculation unit 240 and a weighting adjustment unit 250. The device 200 for adjusting weighting values in light metering is coupled to an input sensor unit 102. The device 200 for adjusting weighting values in light metering can, for example but non-limitedly, divide the obtained input image Im into 5×5 metering zones MA(1)~MA(25) and adjust the corresponding exposure weighting values.

The image sensor unit 102 can be, for example, implemented by a complementary metal-oxide-semiconductor (CMOS) sensor or a charge-coupled device (CCD) sensor. The input image Im sensed by the image sensor unit 102 includes a number of pixels. Each of the pixels corresponds to a piece of pixel datum, such as the pixel P(n) which corresponds to a piece of pixel datum. The pixel P(n) includes three sub-pixels, whose pixel datum includes three pieces of sub-pixel datum. The number of pixels is relative to the specification of the image sensor unit 102, such as resolution.

The color ratio calculation unit 210 is coupled to the image sensor unit 102, for obtaining a number of pixel data of the input image Im and calculating skin color information for each pixel data. An example is made with reference to the pixel datum of the pixel P(n) in FIG. 3A. In an embodiment, after the color ratio calculation unit 210 obtains a piece of pixel datum of the pixel P(n), the color ratio calculation unit 210 calculates a first reference value K and a second reference value Z according to the ratios among a number of sub-pixel data of the pixel datum P(n). For example, the two reference values K and Z can be calculated as follow:

$$K = \sqrt{\left(\frac{R_{input}}{G_{input}}\right)^2 + \left(\frac{R_{input}}{B_{input}}\right)^2} - 1.4 \quad (1)$$

$$Z = \tan^{-1}\left(\left(\frac{R_{input}}{B_{input}}\right) / \left(\frac{R_{input}}{G_{input}}\right)\right) - 0.7 \quad (2)$$

wherein the $R_{input}$, $G_{input}$, and $B_{input}$ indicate three sub-pixel data of a piece of pixel datum, respectively, which can be red, green, and blue sub-pixel data, respectively. The two reference values K and Z can be calculated according to the ratios among these pixel data. Then, the two reference values K and Z are transmitted to the determination unit 220 and served as reference for skin color determination.

The determination unit 220 is for determining whether the color of each pixel of the input image Im is skin color. An example is made with reference to the pixel P(n). In an embodiment, in determining whether the color of each pixel datum is skin color, the determination unit 220 determines whether the first reference value K and the second reference value Z are within a predetermined region. For example, an approach is provided below to demonstrate how to determine whether the first reference value K and the second reference value Z are within a predetermined region:

$$Skin_{Pixel} = \begin{cases} 1, & \text{if } 0 \le K \le 2.1 \text{ and } 0 \le Z \le 0.35 \\ 0, & \text{otherwise} \end{cases} \quad (3)$$

wherein the predetermined region is a section where K ranges between 0 and 2.1 and Z ranges between 0 and 0.35. The symbol $Skin_{Pixel}$ indicates the determination result of a piece of pixel data determined by the determination unit 220. The value of $Skin_{Pixel}$ indicates whether the pixel data is skin color or not. If $Skin_{Pixel}$ is 1, this indicates that the pixel data of the pixel P(n) is skin color. If $Skin_{Pixel}$ is 0, this indicates that the pixel data of the pixel P(n) is not skin color. In other words, the determination unit 220 generates a respective $Skin_{Pixel}$ for each pixel datum, and determines the value of $Skin_{Pixel}$ according to whether the reference values K and Z are within the mentioned region, so as to determine whether each pixel datum is skin color. In the embodiment, a corresponding pixel of $Skin_{Pixel}$ having 1 is referred to as a skin color pixel.

As in the mentioned embodiment, calculation of the two reference values K and Z and determination of the predetermined region can be accordingly designed with respect to different requirements. Moreover, the provided description, in which the color ratio determination unit 210 determines two reference values K and Z of a piece of pixel data and the determination unit 220 determines whether the pixel data is a skin color data, is made for demonstrating the application without any intention of limitation. In practical, skin color determination can be implemented with different embodiments. For example, it is practicable to collect a statistic range of possible values for the red, green, and blue sub-pixel data in general skin color, and three sub-pixel data in each pixel data will be compared with the statistic range respectively. Those approaches for determining whether a pixel data is skin color will be regarded as practicable embodiments of the application.

FIG. 3C is a schematic diagram showing an example of distribution of skin color pixels over the multiple metering zones in FIG. 3B, which are generated by the determination unit according to the input image Im in FIG. 3A. In this sample, the skin color pixels are generated according to the equations (1) to (3). The skin color pixels are located in the skin color regions F1 to F3. In this example, the skin color regions F1 and F2 contain skin color pixels which correspond to the human faces in FIG. 3A.

However, in practical, there might have some regions having skin color pixels, such as the region F3 in FIG. 3C, which does not correspond to the faces in FIG. 3A. The skin color have the characteristic of continuity, such as high amount of skin color pixels, large skin color region, or continuous appearance of the skin color pixels. As such, in an embodiment of the application, such characteristic can be used to remove/filter unnecessary information, such as discrete skin color pixels, while those skin color pixels close to the location of human faces will be remained, which enhances the correctness in skin color determination. This function is performed by the filter unit 230, which is described below with reference to FIG. 2.

According to the determination result of a pixel datum and the determination results of a number of neighboring pixel data provided by the determination unit 220, the filter unit 230 determines again whether the color of each pixel datum of the input image is skin color. An example is made with reference to the pixel P(n). In an embodiment, if the determination unit 220 determines that the pixel P(n) is a skin color pixel, the filter unit 230 can base on a number of previous pixel data for further determination.

Figures 3D, 3E, 3F:
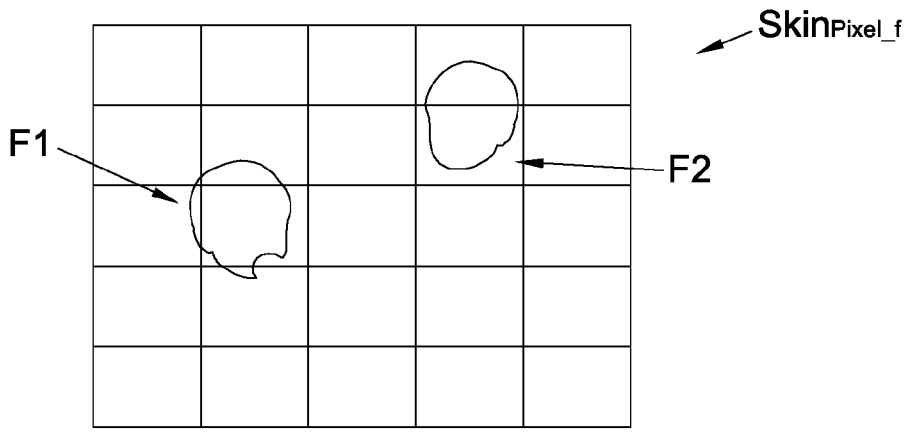
FIG. 3D is a schematic diagram showing an example of distribution of skin color pixels in FIG. 3C of the multiple metering zones in FIG. 3B after filtered by the filter unit.
FIG. 3E is a schematic diagram showing an example of the respective ratio of skin color pixels in the multiple metering zones.
FIG. 3F is a schematic diagram showing an example of the exposure weighting values which are assigned by the weighting adjustment unit on the basis of the input image Im in FIG. 3A according to the embodiment of the application.
Figures 3G, 4:
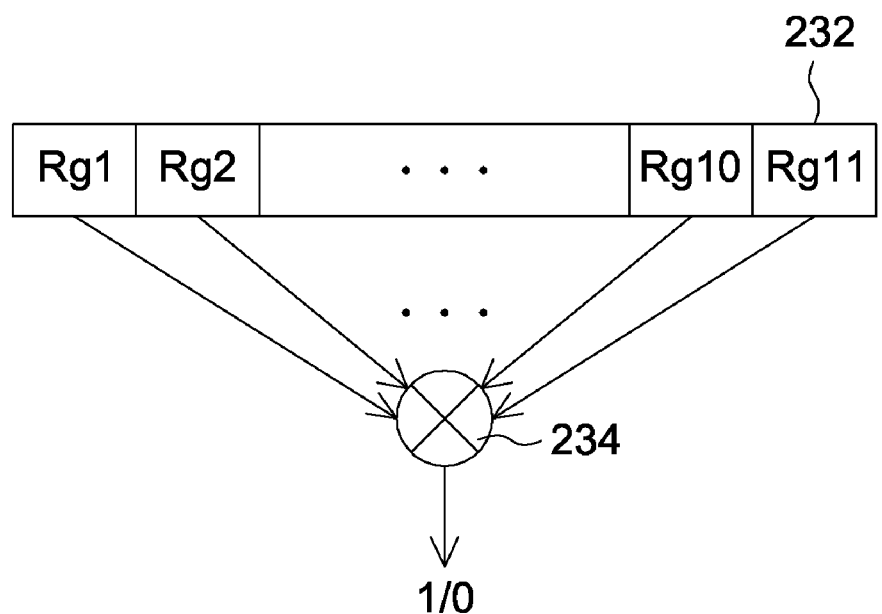
FIG. 3G is a schematic diagram showing an example of center-weighted exposure switching values.
FIG. 4 is a schematic diagram showing an example of the filter unit of the device for adjusting weighting values in light metering of FIG. 2.

FIG. 4 is a schematic diagram showing an example of the filter unit 230 of the device 200 for adjusting weighting values in light metering of FIG. 2. The filter unit 230 includes an 1×11 determination matrix 232 and a multi-input AND gate 234. The determination matrix 232 includes 11 registers Rg1 to Rg11, and the multi-input AND gate 234 outputs according to the content of the 11 registers Rg1 to Rg11. The registers Rg1 to Rg11 store the determination results of the pixel P(n) and its previous ten pixels (not shown), i.e., they store $Skin_{Pixel}(n-1)$ to $Skin_{Pixel}(n-10)$ and $Skin_{Pixel}(n)$ which the determination unit generate according to the equation (3). In this example, if all the pixel P(n) and its ten pixels are determined as skin color pixels, i.e., all $Skin_{Pixel}(n-1)$ to $Skin_{Pixel}(n-10)$ and $Skin_{Pixel}(n)$ are equal to 1, the multi-input AND gate 234 will provide its output $Skin_{Pixel\_f}(n)$ as 1, which confirms that the pixel P(n) is a skin color pixel. On the contrary, if at least one of the pixel P(n) and its ten pixels is determined as not skin color pixels, i.e., at least one of the values of $Skin_{Pixel}(n-1)$ to $Skin_{Pixel}(n-10)$ and $Skin_{Pixel}(n)$ are not equal to 1, the filter unit 230 will provide its output $Skin_{Pixel\_f}(n)$ as 0, which indicates that the pixel P(n) is not a skin color pixel.

FIG. 3D is a schematic diagram showing an example of distribution of skin color pixels in FIG. 3C in the multiple metering zones in FIG. 3B after filtered by the filter unit. As shown in FIG. 3D, by filtering by the filter unit 230, the embodiment can determine the color pixels in the color region F3 as not skin color, and determine the skin color pixels in the regions F1 and F2 which has the characteristic of continuity as skin color. Therefore, the correctness in skin color determination can be enhanced.

Refer to FIG. 2 for further description. In an embodiment, the calculation unit 240 calculates a ratio of the amount of the pixel data determined as the skin color in each metering zone to the amount of overall pixel data in each metering zone. Moreover, the weighting adjustment unit 250 adjusts the corresponding exposure weighting values of the metering zones according to the calculation ratios of the calculation unit 240. How the calculation unit 240 calculates ratios can be as follows for example:

$$W_{skin} = \frac{Skin'_{pixel}}{Block_{pixel}} \quad (4)$$

wherein $Skin'_{pixel}$ indicates the amount of skin color pixels in a metering zone; $Block_{pixel}$ indicates the amount of overall pixel data in the metering zone; and $W_{skin}$ indicates the ratio of the amount of skin color pixels to the amount of overall pixel data in the metering zone.

An example is made with reference to FIG. 3D. According to the equation (4), the calculation unit 240 can calculate ratios $W_{skin}(1)$ to $W_{skin}(25)$ for the 25 metering zones MA(1) to MA(25), respectively, as shown in FIG. 3E. After that, the weighting adjustment unit 250 adjusts the corresponding exposure weighting values of the metering zones MA(1) to MA(25) based on the ratios $W_{skin}(1)$ to $W_{skin}(25)$ from the calculation unit 240.

In adjusting the corresponding exposure weighting values of the metering zones, the weighing adjustment unit 250 can, for example, assign higher exposure weighting values to those metering zones with higher ratios. In addition, the neighboring metering zones with lower ratios can also be used as reference for determining exposure values, so as to prevent over-exposure on the face portions. FIG. 3F is a schematic diagram showing an example of the exposure weighting values WEV2 which are assigned by the weighting adjustment unit 250 on the basis of the input image Im in FIG. 3A according to the embodiment of the application. The weighting adjustment unit 250 assigns exposure weighting values WEV2(1) to WEV2(25) to the metering zones MA(1) to MA(25), which are represented by the values as shown. As in this example, higher exposure weighting values are assigned to those metering zones containing more skin color pixels, such as the metering zones MA(12) and MA(9). In this way, the embodiment assigns the exposure weighting values based on to the ratios of the skin color pixels for each zone in the image, thereby increasing the exposure accuracy for skin color.

In another embodiment, the calculation unit 240 calculates an amount of the pixel data determined as the skin color pixel for each metering zone, as denoted by $Skin'_{Pixel}$ in equation (4) for example. The weighting adjustment unit 250 adjusts the corresponding exposure weighting values of the metering zones according to the calculated amounts from the calculation unit 240. In other words, the weighting adjustment unit 250 adjusts the corresponding exposure weighting values of the metering zones MA(1) to MA(25) according to the calculated amounts from the calculation unit 240. Similarly, the weighing adjustment unit 250 assigns higher exposure weighting values to those metering zones with higher ratios, as shown in FIG. 3F.

The mentioned description is provided as an example in which the calculation unit 240 calculates the ratio of skin color pixels or the amount thereof, which is made for demonstrating the application without any intention of limitation. Any approach will be regarded as practicable as long as skin color pixels are used in calculating meaningful reference values for the statistic value of skin color in the metering zones. Moreover, as in the example shown in FIG. 3B in which the input image Im is divided into 25 metering zones MA(1) to MA(25), the number of divided metering zones is made for illustrating the application exemplarily and non-limitedly. Instead, the number of metering zones can be accordingly designed with respect to different user requirements and practical implementations.

As can be obtained from the mentioned description, by using the ratio or the amount of skin color pixels, i.e. the pixel whose pixel data determined as skin color, the device for adjusting weighting values in light metering is capable of adjusting the exposure weighting values for each metering zone, so as to determine the exposure time. In other words, the device for adjusting weighting values in light metering can determine the exposure time by simple computation, such as calculation of number or ratio, thereby reducing the cost and computational complexity.

Besides, in yet another embodiment, the weighting adjustment unit 250 adjusts the exposure weighting values as follows. An example is made with reference to FIG. 3A. It is assumed that the pixel data of the input image Im are obtained under the condition that a number of first exposure weighting values WEV1(1) to WEV1(25) of the metering zones MA(1) to MA(25), such as the center-weighted exposure weighting values, are as shown in FIG. 3G. In this example, according to the calculation results (the ratio or the amount of skin color pixels) of the calculation unit 240, the weighting adjustment unit 250 generates a number of second exposure weighting values WEV2(1) to WEV2(25) which correspond to the metering zones MA(1) to MA(25), as shown in FIG. 3F. After that, the weighting adjustment unit 250 determines weighing values for the metering zones MA(1) to MA(25) according to the first exposure weighting values WEV1(1) to WEV1(25) and the second exposure weighting values WEV2(1) to WEV2(25) which correspond to the metering zones MA(1) to MA(25). In practical, the exposure weighting values of the metering zones MA(1) to MA(25) can be obtained by using a proper combination of the two exposure weighting values WEV1 and WEV2. For example, the exposure weighting values of the metering zones MA(1) to MA(25) can be obtained by calculating sum of the exposure weighting values WEV1 and WEV2, or a larger one among WEV1 and WEV2.

In an embodiment, the device 200 for adjusting weighting values in light metering can further increases the computational speed, which is elaborated as follows. Referring to FIG. 2, in practical, in obtaining a number of pixel data of the input image Im from the image sensor unit 102, the color ratio calculation unit 210 can obtain the pixel data sequentially. In other words, the color ratio calculation unit 210 can obtain one piece of pixel datum each time. Then, the calculation unit 240 performs calculation based on the metering zone containing the obtained pixel datum. In this way, the device 200 for adjusting weighting values in light metering can process pixel data sequentially, so that the computational speed thereof can be increased significantly. Therefore, the embodiment can perform real-time exposure compensation, and can be used in dynamic video techniques. Moreover, the embodiment also allows the device 200 for adjusting weighting values in light metering to avoid using high-capacity memory, thereby saving space for hardware implementation.

According to the method and device for adjusting weighting values in light metering disclosed in the present embodiments of the application, an input image is divided into multiple metering zones, and the amount of the pixel data determined as the skin color is calculated for each metering zone, so as to adjust the corresponding exposure weighting values of the metering zones. In this way, the cost and computational complexity can be reduced. Moreover, an embodiment of the application can process pixel data sequentially, which increases the computational speed significantly. Furthermore, an embodiment of the application can avoid using high-capacity memory for storing the whole input image, thereby saving space for hardware implementation.

While the application has been described by way of example and in terms of a preferred embodiment, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for adjusting weighting values in light metering, comprising:
    dividing an input image into multiple metering zones, the input image including a plurality of pixel data and the metering zones corresponding to a plurality of exposure weighting values;
    determining whether color of each pixel datum of the input image is skin color;
    determining the color of each pixel datum which is determined to be skin color again according to a determination result of the pixel datum and determination results of a plurality of neighboring pixel data, wherein if the pixel datum and its neighboring pixel data are all determined as skin color pixels, confirming that the pixel datum is a skin color pixel and if at least one of the pixel datum and its neighboring pixel data is determined as not skin color pixels, confirming that the pixel datum is not a skin color pixel;
    calculating an amount of the pixel data determined as the skin color for each metering zone; and
    adjusting the corresponding exposure weighting values of the metering zones according to the calculated results, wherein the step of determining whether the color of each pixel datum of the input image is skin color comprises
    for a piece of pixel datum, calculating a first reference value and a second reference value according to ratios among a plurality of sub-pixel data of the pixel datum; and
    determining whether the first reference value and the second reference value are within a predetermined region, wherein the first reference value and the second reference value are calculated as follows:

$$\text{the first reference value} = \sqrt{\left(\frac{R_{input}}{G_{input}}\right)^2 + \left(\frac{R_{input}}{B_{input}}\right)^2} - 1.4$$

$$\text{the second reference} = \tan^{-1}\left(\left(\frac{R_{input}}{B_{input}}\right) \bigg/ \left(\frac{R_{input}}{G_{input}}\right)\right) - 0.7$$

$R_{input}$, $G_{input}$, $B_{input}$ indicate three sub-pixel data of the piece of pixel datum, respectively.

2. The method for adjusting weighting values in light metering according to claim 1, further comprising:
    sequentially obtaining the pixel data of the input image from an image sensor unit,
    wherein the image sensor unit is implemented by a complementary metal-oxide-semiconductor (CMOS) sensor or a charge-coupled device (CCD) sensor.

3. The method for adjusting weighting values in light metering according to claim 1, wherein the neighboring pixel data are a plurality of previous pixel data.

4. The method for adjusting weighting values in light metering according to claim 1, wherein, in the step of calculating an amount of the pixel data determined as the skin color for each metering zone, calculated is a ratio of the amount of the pixel data determined as the skin color in each metering zone to the amount of overall pixel data in each metering zone.

5. The method for adjusting weighting values in light metering according to claim 1, wherein, in the step of adjusting the corresponding exposure weighting values of the metering zones according to the calculated results, higher exposure weighting values are assigned to metering zones having higher amount of the pixel data determined as the skin color.

6. The method for adjusting weighting values in light metering according to claim 1, wherein the pixel data of the input image are obtained according to a plurality of first exposure weighting values which correspond to the metering zones, and the step of adjusting the exposure weighting values for the metering zones includes:
    generating a plurality of second exposure weighting values which correspond to the metering zones according to the calculated results; and
    determining the corresponding weighting values of the metering zones according to the first exposure weighting values and the second exposure weighting values of the metering zones.

7. The method for adjusting weighting values in light metering according to claim 1, wherein the step of determining whether the color of the pixel data of the input image is skin color comprises:

$$Skin_{Pixel} = \begin{cases} 1, \text{ if } 0 \leq K \leq 2.1 \text{ and } 0 \leq Z \leq 0.35 \\ 0, \text{ otherwise} \end{cases}$$

K is the first reference value and Z is the second reference value;

the predetermined region is a section where the first reference value ranges between 0 and 2.1 and the second reference value ranges between 0 and 0.35;

if $Skin_{Pixel}$ is 1, the determining step determines that the color of the pixel data is skin color; and if $Skin_{Pixel}$ is 0, the determining step determines that the color of the pixel data is not skin color.

8. A device for adjusting weighting values in light metering, dividing an input image into multiple metering zones and adjusting corresponding weighting values of the metering zones, the input image including a plurality of pixel data, the device comprising:

a determination unit for determining whether color of each pixel datum of the input image is skin color;

a filter unit for determining the color of each pixel datum which is determined to be skin color again according to a determination result of a pixel datum and determination results of a plurality of neighboring pixel data, provided by the determination unit, wherein if the pixel datum and its neighboring pixel data are all determined as skin color pixels, confirming that the pixel datum is a skin color pixel and if at least one of the pixel datum and its neighboring pixel data is determined as not skin color pixels, confirming that the pixel datum is not a skin color pixel;

a calculation unit for calculating an amount of the pixel data determined as the skin color for each metering zone;

a weighting adjustment unit for adjusting the corresponding exposure weighting values of the metering zones according to the calculated results; and a color ratio calculation unit for calculating a first reference value and a second reference value according to ratios among a plurality of sub-pixel data of a pixel datum, wherein in determining whether the color of each pixel datum is skin color, the determination unit determines whether the first reference value and the second reference value are within a predetermined region, and the first reference value and the second reference value are calculated as follows:

$$\text{the first reference value} = \sqrt{\left(\frac{R_{input}}{G_{input}}\right)^2 + \left(\frac{R_{input}}{B_{input}}\right)^2} - 1.4$$

$$\text{the second reference} = \tan^{-1}\left(\left(\frac{R_{input}}{B_{input}}\right) / \left(\frac{R_{input}}{G_{input}}\right)\right) - 0.7$$

$R_{input}$, $G_{input}$, $B_{input}$ indicate three sub-pixel data of the piece of pixel datum, respectively.

9. The device for adjusting weighting values in light metering according to claim 8, wherein:

the color ratio calculation unit is coupled to an image sensor unit so as to sequentially obtain the pixel data of the input image from the image sensor unit; and the image sensor unit is implemented by a complementary metal-oxide-semiconductor (CMOS) sensor or a charge-coupled device (CCD) sensor.

10. The device for adjusting weighting values in light metering according to claim 8, wherein the neighboring pixel data are a plurality of previous pixel data.

11. The device for adjusting weighting values in light metering according to claim 8, wherein the calculation unit further calculates a ratio of the amount of the pixel data determined as the skin color in each metering zone to the amount of overall pixel data in each metering zone.

12. The device for adjusting weighting values in light metering according to claim 8, wherein if the weighing adjustment unit adjusts the corresponding exposure weighting values of the metering zones, higher exposure weighting values are assigned to metering zones having higher amount of the pixel data determined as the skin color.

13. The device for adjusting weighting values in light metering according to claim 8, wherein:

the pixel data of the input image are obtained according to a plurality of first exposure weighting values which correspond to the metering zones;

the weighting adjustment unit generates a plurality of second exposure weighting values which correspond to the metering zones according to the calculated results of the calculation unit; and the weighting adjustment unit determines the corresponding weighting values of the metering zones according to the first exposure weighting values and the second exposure weighting values of the metering zones.

14. The device for adjusting weighting values in light metering according to claim 8, wherein $$Skin_{Pixel} = \begin{cases} 1, \text{ if } 0 \leq K \leq 2.1 \text{ and } 0 \leq Z \leq 0.35 \\ 0, \text{ otherwise} \end{cases}$$

K is the first reference value and Z is the second reference value;

the predetermined region is a section where the first reference value ranges between 0 and 2.1 and the second reference value ranges between 0 and 0.35;

if $Skin_{Pixel}$ is 1, the determining unit determines that the color of the pixel data is skin color; and if $Skin_{Pixel}$ is 0, the determining unit determines that the color of the pixel data is not skin color.

* * * * *